United States Patent [19]
Dralle

[11] Patent Number: 5,332,409
[45] Date of Patent: Jul. 26, 1994

[54] AIR FILTRATION SYSTEM

[75] Inventor: James R. Dralle, Lemont, Ill.

[73] Assignee: A. J. Dralle, Inc., Lemont, Ill.

[21] Appl. No.: 38,114

[22] Filed: Mar. 29, 1993

[51] Int. Cl.$^5$ .............................................. B01D 46/10
[52] U.S. Cl. ..................................... 55/484; 55/493; 55/497; 55/501; 55/502; 55/516
[58] Field of Search ................. 55/480, 481, 483, 484, 55/493, 495, 497, 501, 502, 516

[56] References Cited

U.S. PATENT DOCUMENTS

| | | |
|---|---|---|
| 3,246,456 | 4/1966 | Sharp . |
| 3,247,652 | 4/1966 | Annas et al. . |
| 3,280,541 | 10/1966 | Soltis ............................. 55/484 X |
| 3,376,695 | 4/1968 | Muckley ........................ 55/516 X |
| 3,460,322 | 8/1969 | Rivers et al. ...................... 55/484 |
| 3,494,113 | 2/1970 | Kinney . |
| 3,793,813 | 2/1974 | McAllister . |
| 4,088,463 | 5/1978 | Smith . |
| 4,217,121 | 8/1980 | Fichter ............................ 55/501 X |
| 4,334,899 | 6/1982 | McConnell ................... 55/480 X |
| 4,518,405 | 5/1985 | Lough et al. . |

OTHER PUBLICATIONS

Brochure entitled "Filtration Product Guide" by HEFCO, 4 pages, dated 1989.
Brochure entitled "How Far Do Contaminants Get With A HEFCO Air²?" by HEFCO, 4 pages, dated 1987.
Brochure entitled "AirFlo", bulletin AC82F by HEFCO, 6 pages, dated 1982.
Brochure entitled "Ultra-Flo, the Ultimate in Filter Performance." by HEFCO, Bulletin #UF82B, 4 pages, dated 1987.
Brochure entitled "AIRx" by HEFCO, bulletin No. AX90A, 4 pages, dated 1989.
Brochure entitled "Extruded Aluminum Frames for laminar flow HEPA filters" by HEFCO, 2 pages, dated 1987.
Brochure entitled "AIRFLO'V'" by HEFCO, bulletin AV82F, 6 pages, dated 1985.
Brochure entitled "ACCU-SEAL HEPA Holding Frame" by HEFCO, 2 pages, dated 1988.
Brochure entitled "AIRFLO LP" by HEFCO, bulletin ALP 86F, 2 pages, dated 1986.
Document entitled "General Info", including sections titled General Information on HEPA Filters, General Information on ASHRAE Filters, and Frame Design by HEFCO, 4 pages, dated 1989.
Document entitled "Index and General Terms" by HEFCO, 2 pages, dated 1986.
Document entitled "Marketing Bulletin 1", by HEFCO, 2 pages, dated 1982.
Document entitled "Ceiling Diffuser Filter" by HEFCO, 1 page, undated.
Document entitled "Absolute Filter (HEPA) Special 'Box' Flanges/Metal Frame" by HEFCO, 1 page, undated.
Drawing entitled "AIROFLO 'LP' Ashrae Rated Filter" by HEFCO, 1 page, dated 1987.
Document entitled "Glove Box Filter" by HEFCO, 1 page, undated.

Primary Examiner—Charles Hart
Attorney, Agent, or Firm—Willian Brinks Hofer Gilson & Lione

[57] ABSTRACT

An air filtration system includes a holding frame supported by a universal mounting frame and a cartridge in the holding frame. The holding frame has a header used to permanently mount and seal the holding frame to the universal frame. The filtration cartridge fits inside the holding frame and is easily replaceable. A seal is provided between the holding frame and cartridge to assure that air passing through the system passes through the cartridge. In a preferred embodiment, the seal is provided on a flange at the back of the holding frame and another seal is provided on a cover that holds the cartridge into the holding frame.

28 Claims, 9 Drawing Sheets

AIR FILTRATION SYSTEM

The present invention relates to air filtration systems and, more particularly, to an air filtration system which uses replaceable cartridges.

Air must be filtered in many places, with the degree of filtration dependent primarily on the degree of air purity required. Air filtration is commonly required in hospitals, particularly operating rooms, and in many manufacturing facilities.

One air filtration application that is of a particular interest is the air supplied to drying ovens used to dry paint or other coatings on automobile bodies. In a typical automobile assembly plant, each assembly line will have several ovens, one for drying each coating applied to the body. Many of these ovens are hundreds of feet in length. The drying air that is used in these ovens must be hot, as well as clean. The hot air is recirculated from the oven, past a burner, and passed through jets back into the oven.

Because of the high quality required on the final finish of an automobile, the air must be filtered on each pass through the system. In the oven there are many contaminants, such as incinerated masking materials, chips of paint or coating that build up on the conveyor equipment, etc. These contaminants over a 10 micron particle size must be removed. Even though particles somewhat larger than 10 microns are not visible to the unaided eye, they will visibly mar the finish normally applied to an automobile body. In some instances it is desirable to filter out particles over 5 microns in size, thereby allowing for thinner paint coatings.

Typically, the heated air for such drying ovens is heated and filtered in an "air handler." An air handler will generally include a bank of filtration units stacked to form a wall-to-wall and floor-to-ceiling filter system. The bank of filtration units is made from universal mounting frame units bolted together to form the filtration system framework. Each mounting frame has an opening which is then used to hold an individual air filter.

Because the air is heated, the filters must be capable of withstanding temperatures of up to 900° F. Filters for such applications are made with a steel housing into which a filter media pack is secured. The filter media pack is typically a non-woven fiberglass. Corrugated aluminum separators fit between pleats made in the fiberglass to allow air to pass through the media pack with as little resistance as possible, thus increasing the effective surface area of the filter. The housing is provided with a header which is used to hold the filter in the universal mounting frame. Typically, such filters are held into the frame by pigtail clips. A sealing gasket is also typically provided between the header and the universal frame.

These prior art filters and filter systems have several drawbacks. First, they are quite expensive, and replacement of the filters usually entails throwing out the entire filter, including the media, separators, filter housing and header. Second, when the filters are replaced, there is a tendency for the new filters to not get securely seated in the universal frame, and thereby not form a good seal between the universal frame and the filter housing. The problem of non-sealing is in part due to the fact that with continued replacement of the filters, the pigtail clips become worn, loose or broken, and therefore do not hold the header tight against the seal on the universal frame. Also, the seal itself is often deteriorated by replacement of the filters. The loss of an air seal allows air to pass through the system unfiltered, and thus any particles or contaminants in the air are not removed. This reduction in filtration leads to myriad of problems in the downstream areas affected. For example, impurities can impair the paint surface of automobile bodies being dried in an oven. Thus there is a long felt need for an air filtration system that is more cost effective and that does not have the susceptibility for potential air bypass.

SUMMARY OF THE INVENTION

An air filtration system has been invented that overcomes these problems and meets the long felt need. In one aspect, the invention is a system for filtering air comprising a plurality of mounting frames arranged to support a bank of filtration units; a holding frame in each mounting frame, the holding frame having a header for engaging the mounting frame, the holding frames each being sealed with respect to the mounting frames to prevent air from passing between the mounting frames and the holding frames; a replaceable filtration cartridge within each holding frame and containing filtration media, the media being sealed within the filtration cartridge so as to assure that air passing through the cartridge is filtered by said media; and a seal between each cartridge and its respective holding frame to prevent air from passing between the holding frames and the cartridges.

In another aspect, the invention is a holding frame and removable filter cartridge combination for use in filtering air, the combination comprising a box-shaped holding frame having four side walls, a header attached to the side walls and an inwardly projecting flange on the rear of the box; a filter cartridge slidably fit within the holding frame, the cartridge comprising four side walls slightly smaller in outside dimension than the inside dimension of the side walls of the holding frame, and filtration media sealed within the side walls of the cartridge so as to assure that air passing through the cartridge is filtered by the media, the back side of the cartridge bearing against the inwardly projecting flange of the holding frame; a cover plate releasably secured to the header for holding the cartridge inside the holding frame; and a seal to prevent air from passing between the cartridge and the holding frame.

In yet another aspect, the invention is a filter holding frame for use with a replaceable filter cartridge comprising four side walls forming a rectangular box with an open front face for receiving a filter cartridge; a header attached to the side walls for securing the holding frame to a support structure and an inwardly projecting flange on the rear of the box for abutting the filter cartridge when placed therein.

In still another aspect, the invention is a filtration cartridge for use in a filter holding frame designed for easy replacement of the filter cartridge, the cartridge comprising four side walls forming a rectangular box with an open front face and open rear face; filtration media disposed within the box, the filter media being sealed with respect to the side walls to assure that air passing through the cartridge is filtered by the filter media; and flanges connected to the rear face of the box and extending outwardly of the side walls to provide a surface to seal against the holding frame.

Because the system uses replaceable cartridges, the holding frames can stay mounted in the mounting frame, and only the cartridge is thrown away. Because the preferred holding frame has its own sidewalls, the sidewalls of the cartridge can be made of a material having a thickness or gauge less than that of the sidewalls of a conventional filter. Thus, even though the cartridges are replaced, the overall amount of material replaced and thrown away is greatly reduced.

Further, since the holding frames stay mounted in the mounting frames, bolts can be used to permanently hold the holding frame in the mounting frame, and the seal associated therewith is not subject to disruption.

The cartridge is necessarily smaller in dimension than the holding frame so that it can slide in and out. The resulting gap that exists between the sidewalls of the holding frame and the cartridge would normally all occur between the top of the cartridge and top of the holding frame, since gravity would pull the cartridge to the bottom wall when the system is positioned for horizontal air flow. In the preferred embodiment, the cartridge is designed so that projections on the top and bottom side walls center the cartridge in the holding frame. These projections also make it easier to slide the cartridge in and out of the filter holding frame. Preferably the holding frame has side spacers on the inside of the side walls, further helping to center the cartridge. Being centered, it is easier to provide a good seal between the holding frame and the cartridge.

These and other advantages of the invention, as well as the invention itself, will be best understood in view of the attached drawings, a brief description of which follows.

DETAILED DESCRIPTION OF THE DRAWINGS AND PREFERRED EMBODIMENT OF THE INVENTION

Figure 1:
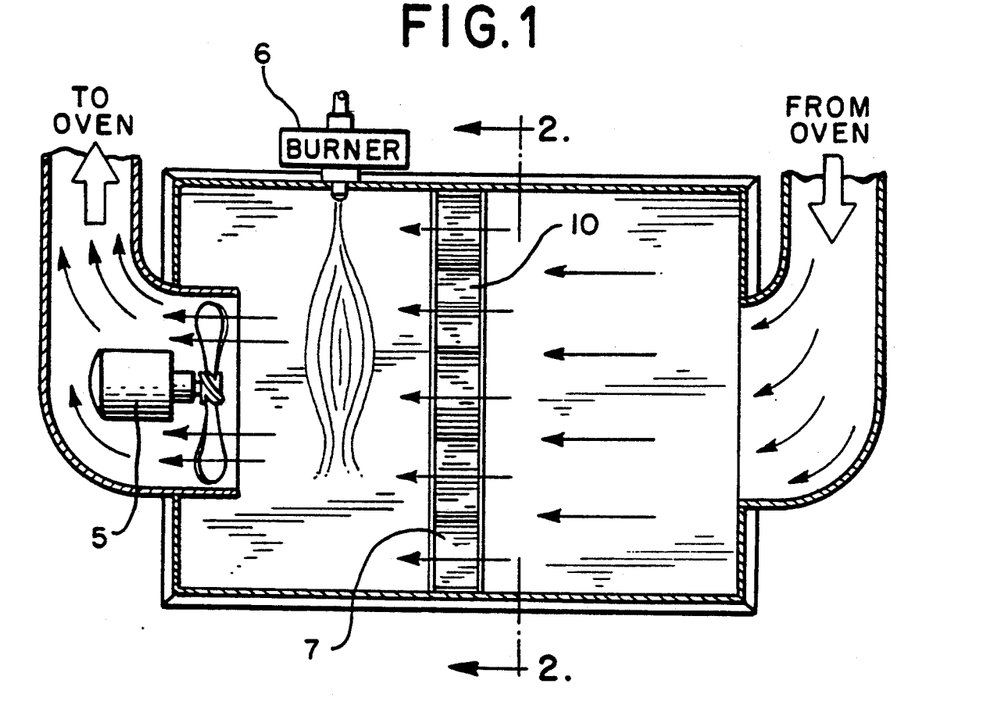
FIG. 1 is a schematic representation of an air handler using a preferred air filtration system of the present invention.

The air filtration system of the present invention will find uses in other applications, but is primarily well suited to be used in the air handler of a drying oven for automobile bodies and the like. A schematic drawing of such an air handler is shown in FIG. 1. Air is drawn from the oven (not shown) by a fan 5. The air is passed through a bank 7 of filtration units 10 and heated by a burner 6. The bank of filtration units 10 is oriented in a vertical fashion, with air traveling horizontally through the filters. The heated, filtered air is then returned to the drying oven, often through duct work that divides the air and introduces it through jets spaced along the length of the oven. Typically, there are a number of air handlers connected to each oven, since the oven may be 600 feet long or longer. The arrangement of the fan 5, burner 6 and filtration units 10 may be different in some air handlers than that shown in FIG. 1, such that the fan 5 draws air from the oven and blows it through the filtration units 10, with the burner 6 being either before or after the filtration unit 10.

Figure 2:
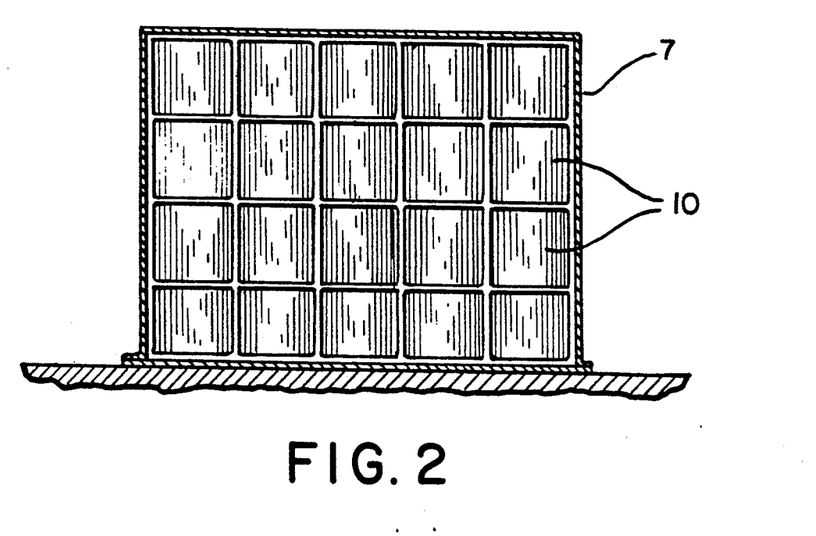
FIG. 2 is an elevational view of a bank of filters taken along line 2—2 of FIG. 1.
Figure 3:
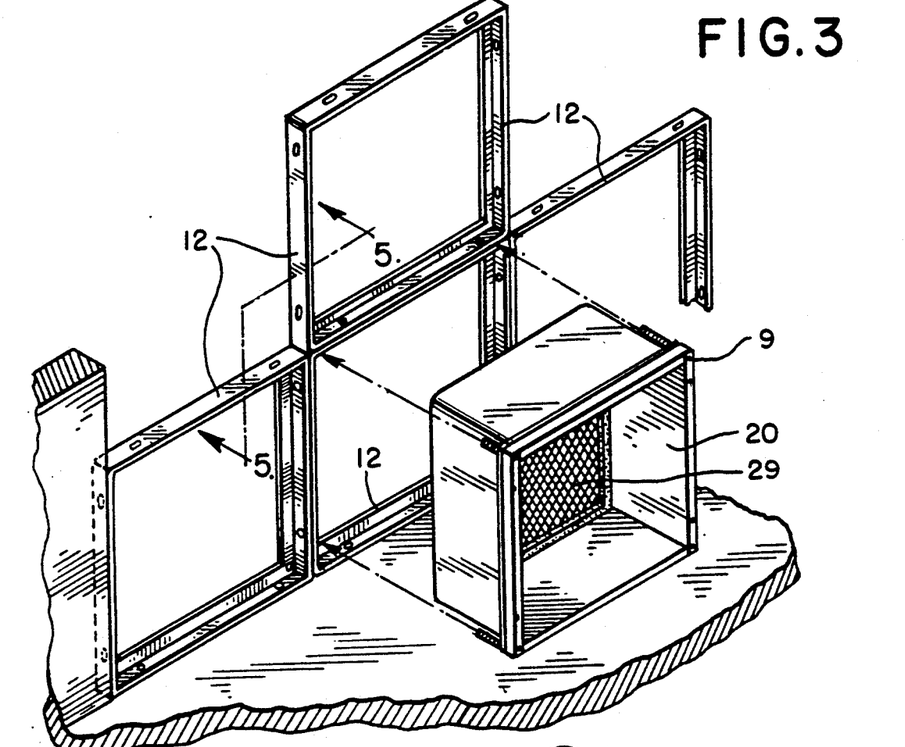
FIG. 3 is an exploded view of a filter holding frame as used in the bank of filters of FIG. 2.
Figure 4:
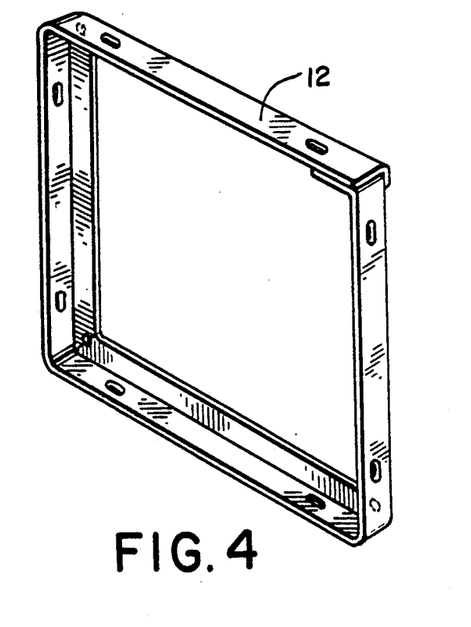
FIG. 4 is a perspective view of a universal mounting frame used to construct the bank of filters of FIG. 2.
Figure 5:
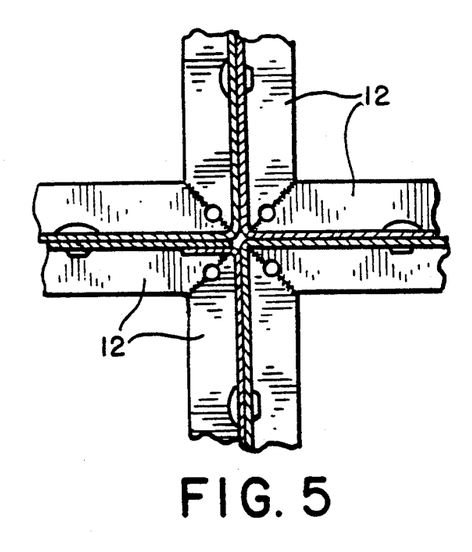
FIG. 5 is an elevational view of the connected corners of four universal mounting frames taken along line 5—5 of FIG. 2.

The air filtration system of the present invention is designed so that it can be used with conventional, universal mounting frames typically used in air handlers. These mounting frames, best seen in FIG. 4, are made of angled steel and bolted together (FIG. 5) to form a support structure for the filtration units, with a flange for engaging an air filter. The universal mounting frames 12 are usually joined to give a wall-to-wall, floor-to-ceiling bank of filters as shown in FIG. 2. The mounting frames 12 of the preferred air filtration system will typically already be in place in a manufacturing facility, and the holding frames 20 and filter cartridges 40 (FIG. 6) of the preferred embodiment are thus preferably sized to fit such universal mounting frames 12, as shown in FIG. 3.

Figure 6:
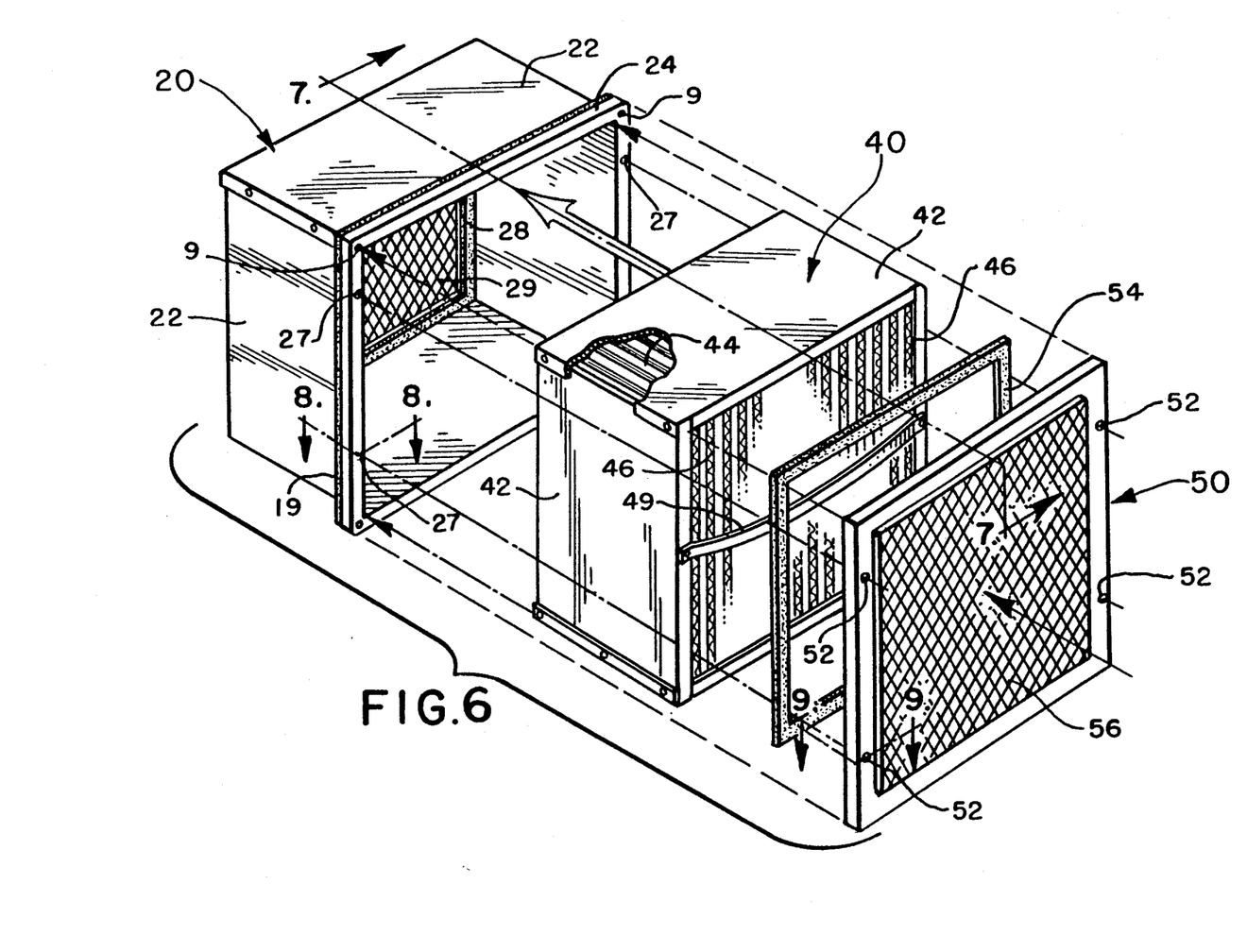
FIG. 6 is an exploded view of a first embodiment of a filter holding frame and filtration cartridge assembly used in the bank of filters of FIG. 2.
Figure 7:
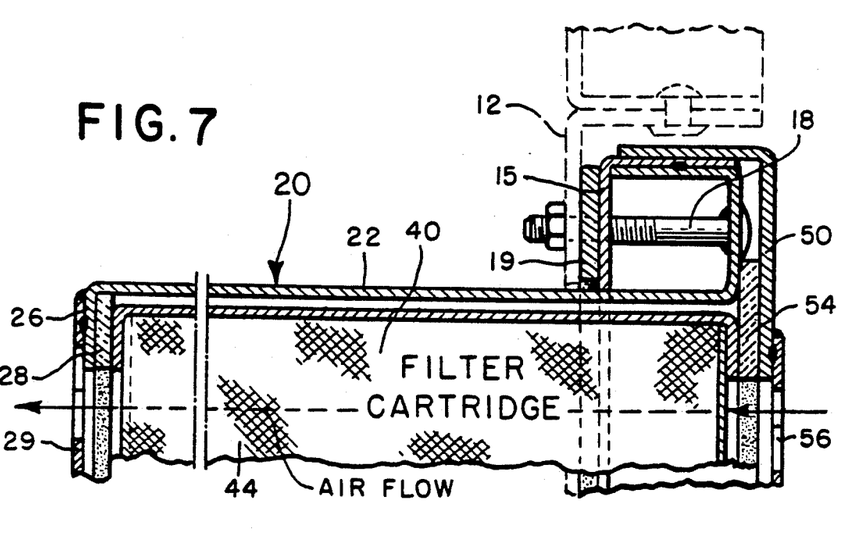
FIG. 7 is a sectional view taken along line 7—7 of FIG. 6.

A preferred holding frame 20 and removable cartridge 40 combination is shown in FIG. 6. The holding frame 20 has a rectangular, preferably square, box shape, made with four side walls 22. A header 24 is attached to the side walls 22 at the front of the holding frame 20. The header 24 is provided for engaging with the mounting frame 12. As seen in FIG. 7, the header 24 is constructed with steel that wraps around to provide a solid face 15 that attaches to the mounting frame 12. In this fashion, the holding frame 20 can be secured to the support structure in a fashion that provides a wide surface in contact with the mounting frame 12 to assure a good seal thereto. The holding frame 20 is preferably sealed to the mounting frame 12 with a fiberglass (for high temperature applications) or neoprene (for low temperature applications) gasket 19, and held in place by bolts 18 through holes 9 in each corner of the header 24.

At its rear, the holding frame 20 comprises an inwardly projecting flange 26. Most preferably the flange 26 is around the complete periphery of the rear of the holding frame 20, and can be constructed by bending inwardly the material used to construct the side walls 22. In the preferred embodiment, a fiberglass gasket 28 is disposed on the inward facing surface of flange 26. The gasket 28 acts as a seal to seal between the cartridge 40 and the holding frame 20 to prevent air from passing between the cartridge 40 and the frame 20. A screen 29 (FIG. 6) may be fastened to the rear of the holding frame 20 to help support the filtration media in the filter cartridge 40.

As best seen in FIG. 6, the replaceable filter cartridge 40 is also preferably a rectangular box-shaped element with four side walls 42. The side walls 42 of the cartridge 40 will of course be slightly smaller in outside diameter than the inside dimensions of the side walls 22 of holding frame 20 so that the cartridge 40 can be slidably fit within the holding frame 20. As shown in FIG. 6, the cartridge 40 is preferably insertable in the front face of the box of holding frame 20 as in the same direction that air passes through the filtration unit. The back side of the cartridge 40 thus bears against the inwardly projecting flange 26 when the filter cartridge 40 is placed inside the frame 20.

A filtration media 44 is sealed to the side walls 42 within the filtration cartridge 40. As shown in FIG. 6, corrugated aluminum separators 46 may be used between pleats of filtration media 44 to allow air to pass through the filtration cartridge 40 with as little resistance as possible, thus increasing the effective surface area of the filter system. The filtration media is preferably effective for filtering out particles 10 micron or larger in size. However, other filtration capacities may be used, depending on the application and desires of the user. In most respects, the filtration media 44 and separators 46 used and their positioning and sealing within the side walls 42 can be the same as conventional filters, and these features are thus not described in more detail.

A strap 49 is preferably placed between two opposite side walls 42 and across the front of the cartridge 40 to provide a handle for removing the cartridge 40 from the filter holding frame 20.

Figure 8:
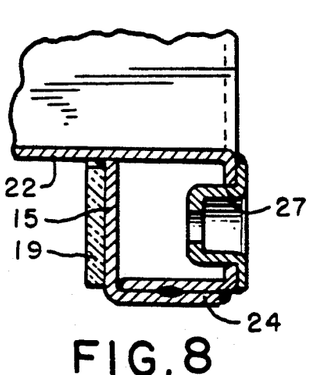
FIG. 8 is a sectional view taken along line 8—8 of FIG. 6.
Figures 9, 10:
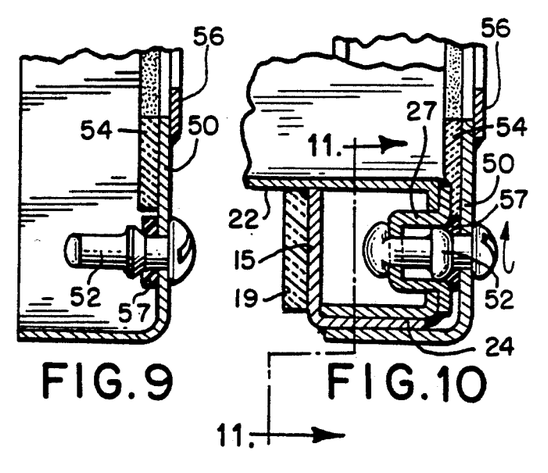
FIG. 9 is a sectional view taken along line 9—9 of FIG. 6.
FIG. 10 is a sectional view showing the structure of FIGS. 8 and 9 when the cover is in place on the filter frame.
Figure 11:
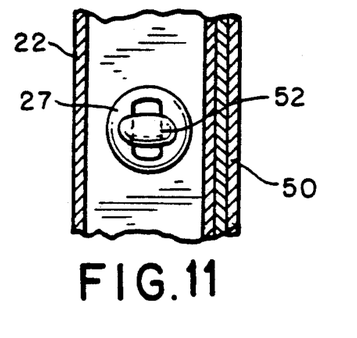
FIG. 11 is a sectional view taken along line 11—11 of FIG. 10.

Also as shown in FIG. 6, the system preferably also comprises a cover plate or member 50 releasably secured or fastened to the header 24 by fasteners 52 (FIG. 9). The header 24 is provided with receptacles 27 for receiving and acting with fasteners 52 (FIG. 8). The cover plate 50 holds the front of the cartridge 40 in the holding frame 20 and tight against the flange 26 at the rear of the holding frame 20 (FIG. 10). The rear of receptacle 27 has an elongated hole through it (FIG. 11) such that when the fastener 52 is rotated by 90°, the enlarged end of the fastener 52 can pass through the hole to allow the cover 50 to be mounted on or removed from the holding frame 20. A washer 57 on the back side of cover plate 50 and around the fastener 52 helps to hold the fastener 52 in proper alignment for insertion into receptacle 27.

Preferably, the cover member 50 covers the space between side walls 22 and side walls 42 and a gasket 54 on the rear side of cover member 50 acts as an additional, or alternate, seal to assure that air passing through the assembly is filtered by the filtration media 44.

The cover 50, the flange 26 at the back of holding frame 20, or preferably both, may support a screen material 56 and 29 to help support the filtration media 44.

FIGS. 12-22 show a second embodiment of a holding frame 120 and cartridge 140. This embodiment is similar in many respects to the holding frame 20 and cartridge 40 of FIGS. 6-11, and is used in the same manner. Elements that are common between the two embodiments are marked with similar reference numbers, increased by an addend of 100 for the second embodiment.

Figures 12, 13:
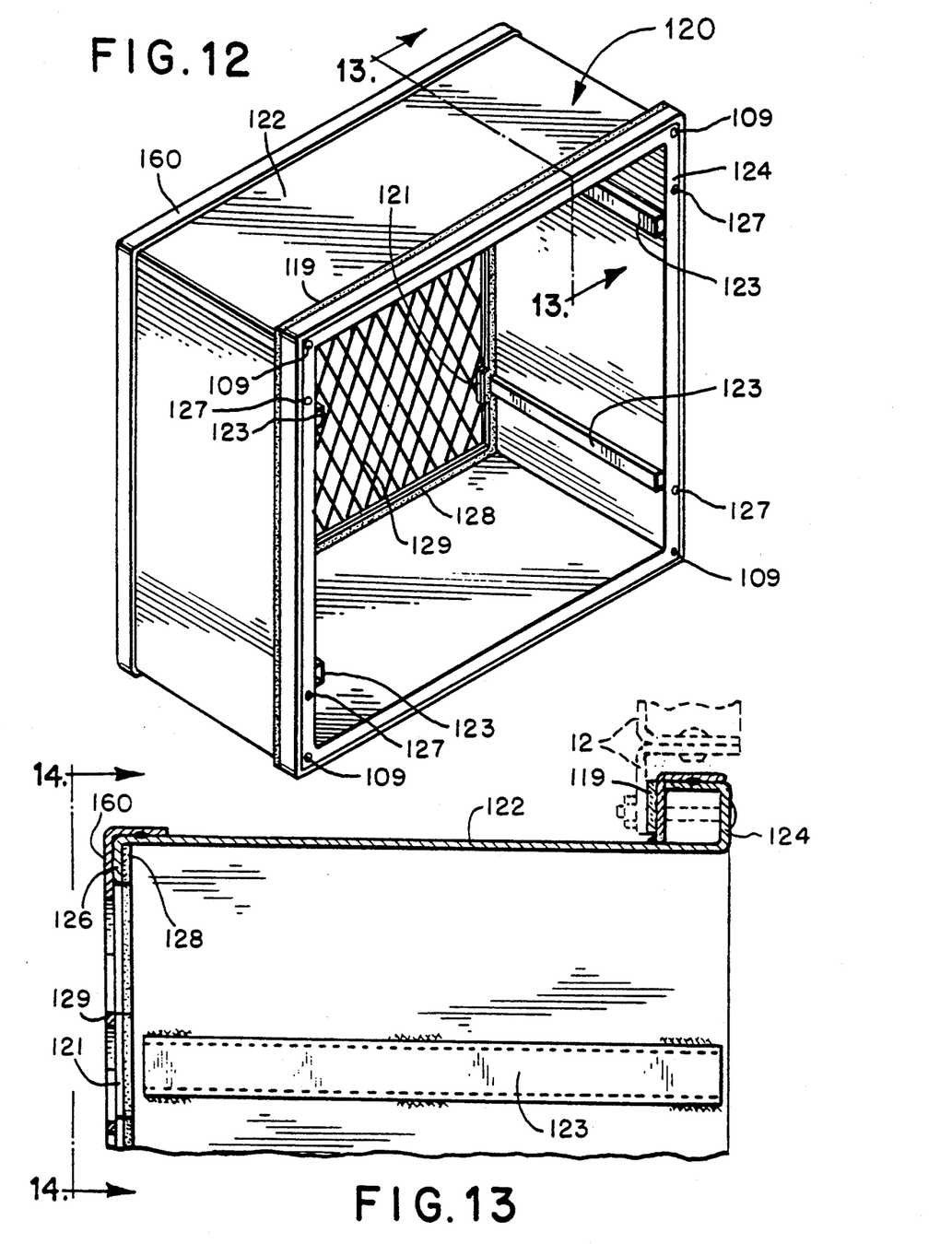
FIG. 12 is a perspective view of a second embodiment of a filter holding frame used in the bank of filters of FIG. 2.
FIG. 13 is a sectional view taken along line 13—13 of FIG. 12.
Figures 14, 16:
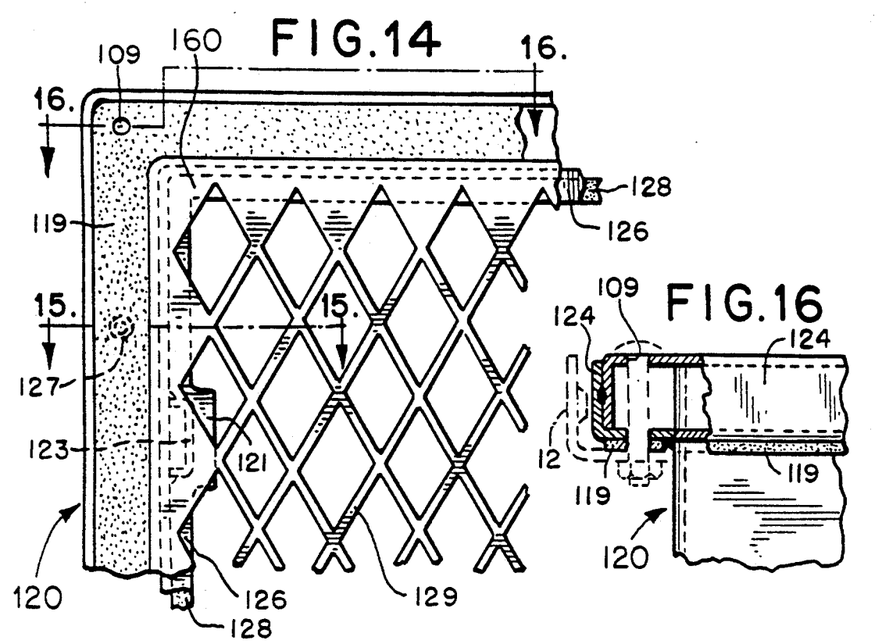
FIG. 14 is an elevational view taken along line 14—14 of FIG. 13.
FIG. 16 is a sectional view taken along line 16—16 of FIG. 14.
Figures 17, 18, 19, 22:
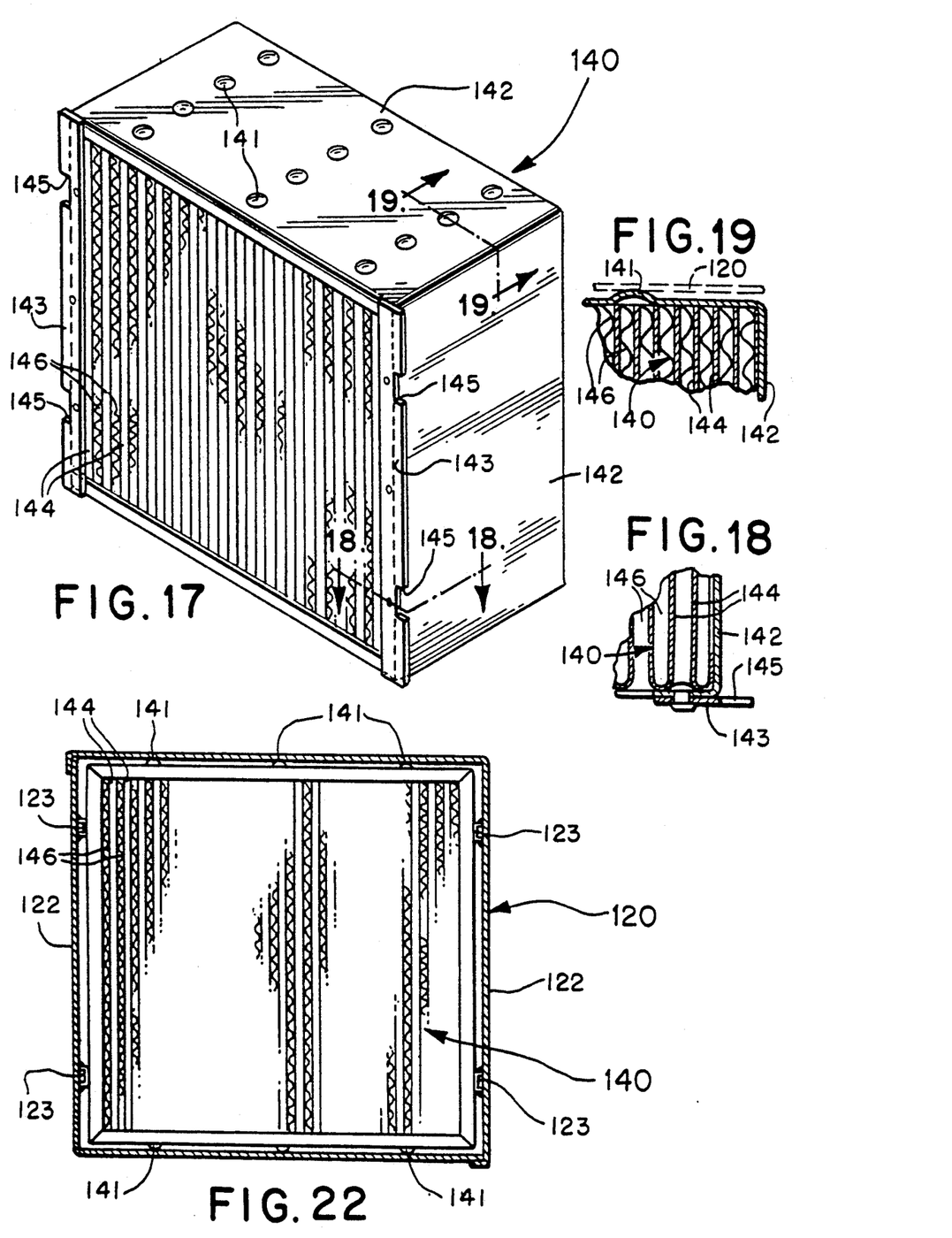
FIG. 17 is a perspective view of a filtration cartridge designed for use with the holding frame of FIG. 12.
FIG. 18 is a sectional view taken along line 18—18 of FIG. 17.
FIG. 19 is a sectional view taken along line 19—19 of FIG. 17.
FIG. 22 is a sectional view taken along line 22—22 of FIG. 20, with the filtration cartridge shown in elevation.
Figure 20:
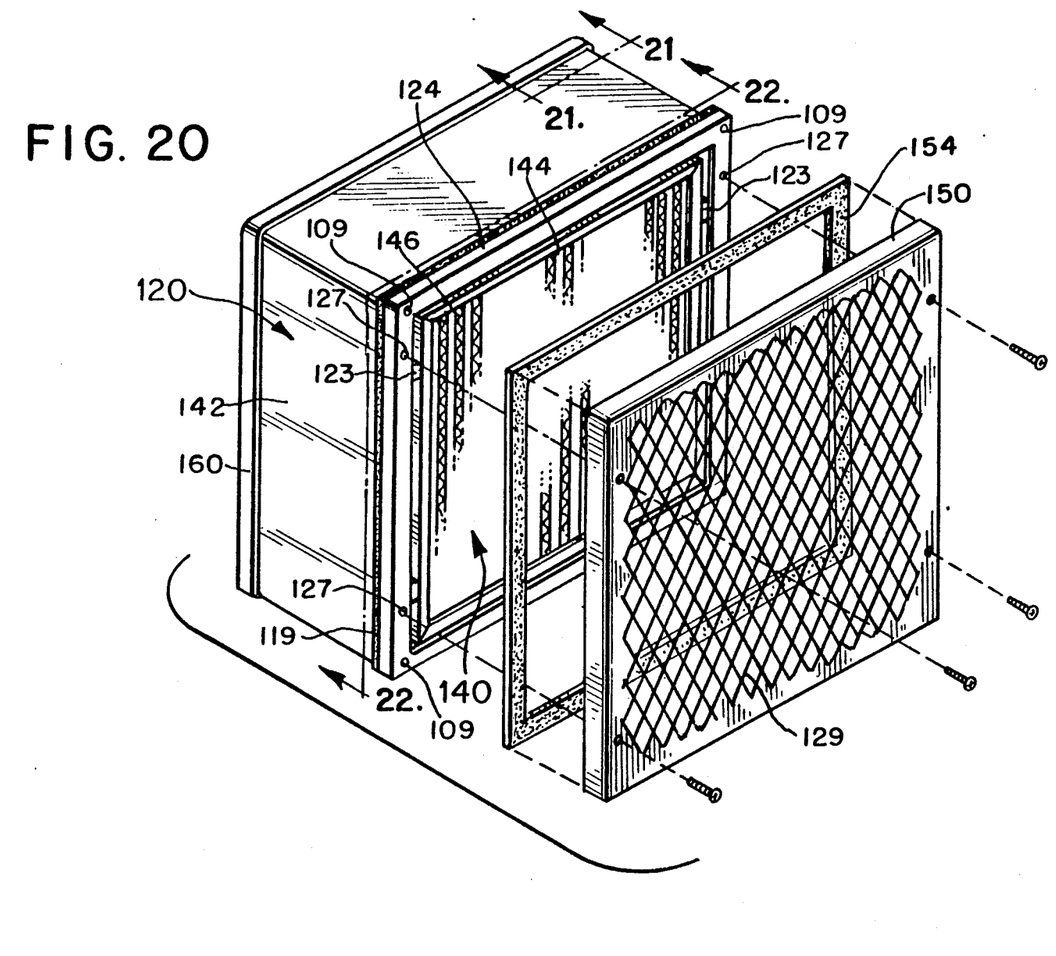
FIG. 20 is an exploded view of the filtration cartridge assembly of FIG. 17 and the filter holding frame of FIG. 12.
Figure 21:
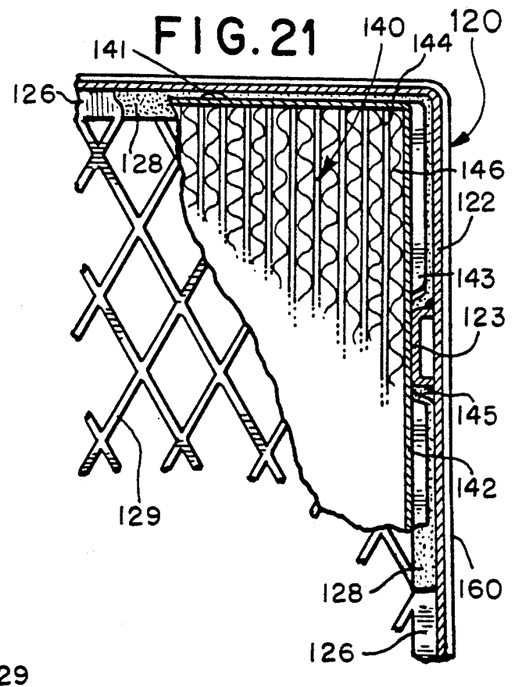
FIG. 21 is a sectional view taken along line 21—21 of FIG. 20.

The major differences in holding frame 120 are that side spacers 123 preferably formed of channel members, (FIGS. 12 and 13) are attached to the side walls 122 of the holding frame 120 and the flange 126 at the rear of holding frame 120 includes extensions 121 (FIG. 14) protruding inwardly in line with the side spacers 123. The gasket 128 is configured to cover these extensions, as shown in FIG. 12. The side spacers 123, of which there are preferably four, two on each of the left and right side walls, help center the cartridge 140 side-to-side in holding frame 120 (FIG. 22).

Figure 15:
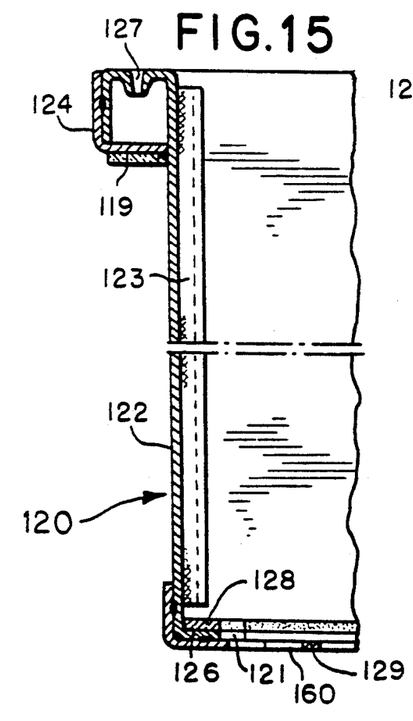
FIG. 15 is a sectional view taken along line 15—15 of FIG. 14.

Other differences in holding frame 120 include the fact that instead of screen 29 welded onto the back side of flange 26, a separate back cover member 160 with stamped diamond-shaped holes (making "screen" 129) (FIG. 14) fits over the rear end of the holding frame 120 and is welded in place. As best seen in FIG. 15, the receptacle 27 in header 24 used to connect cover 50 is replaced by a specially shaped punched hole 127 which is formed by a punching tool to accept a machine screw. Hence in the second embodiment, the cover 150 (FIG. 20) is held to header 124 by four machine screws.

The cartridge 140 is also different in two major respects. First, bumps or projections 141 are provided in the top and bottom side walls 142. As shown in FIGS. 19 and 22, these projections 141 space the cartridge 140 from holding frame 120. Second, flanges 143 are riveted to the back side of cartridge 140 and extend outwardly of the side walls 142. The flanges 143 provide a surface to seal against gasket 128. Each flange 143 is provided with two cut-outs 145 which cooperate with side spacers 123 to allow the cartridge 140 to slide into housing frame 120. The extensions 121 on flanges 126 thus cooperate to extend the gasket 128 sealing area inwardly in the area of cut-outs 145 so that a good seal can still be made (FIG. 21) between flange 126, gasket 128 and the back of cartridge 140.

The cover 150 for the second embodiment, like back cover member 160, is preferably made from one unitary piece with diamond-shaped holes.

In the preferred second embodiment, side spacers 123 are approximately 1 inch wide and protrude about ¼ inch in towards the cartridge 140. The projections 141 are approximately ⅜ inch in diameter at their base and about ¼ inch in height.

The second embodiment is particularly well suited for high temperature applications, where the system is constructed of material that can effectively filter air up to 900° F. In such applications, especially where the cartridge walls 142 are made out of galvanized aluminum or other high temperature resistant metal and the holding frame 120 is made out of stainless steel, the difference in the coefficient of expansion of the materials and the rate of cool down dictate that the outside dimensions of the cartridge 140 be smaller than the inside dimensions of the holding frame 120. Typically the holding frame 120 has an opening 21⅞ inches square, and the filter cartridge 140 is 21½ inches high by 21¼ inches wide. The side spacers 123 and projections 141 then allow the cartridge 140 to easily slide in and out of housing frame 120, and assure that the cartridge 140 is centered, which improves the ability to seal around the system with gaskets, yet still provide for thermal expansion.

The projections 141, being formed in the side walls, also increase the strength of the cartridge 140. The projections would only need to be provided on the bottom side wall 142 of cartridge 140 for centering purposes, but are preferably provided on both bottom and top side walls 142 to make the cartridge 140 insertable in either of two positions and to provide strength to both the top and bottom side walls 142. As shown in FIGS. 12-22, the spacers 123 on the holding frame 120 and the configuration of the cartridge 140 assures that the pleats in the filtration media 144 are vertical when the cartridge is placed in the holding frame 120.

When the invention is used for applications where is does not need to withstand high temperatures, the cartridge 40 can be made with cardboard side walls 42. The filtration media and other components of the cartridge can also be made of materials that can be incinerated, reducing disposal costs.

In the preferred embodiments of the invention, the air flow through the cartridge tends to push the cartridge back against flange 26, thus aiding in holding a tight seal. Also, the cartridge 40 side walls 42 tend to flex outwardly, reducing the gap between the cartridge 40 and holding frame 20, helping keep the cartridge 40 centered.

The gaskets 28 and 54 are preferably a fiberglass mat for high temperature applications and neoprene rubber or foam for low temperature applications.

The present invention provides an improved air filtration system in terms of both cost and efficiency. Because the seals 19 between the universal mounting frame 12 and header 24 are never broken, a uniform, permanent seal is easily maintained, especially where the rear face 15 of header 24 provides a wide surface for making the seal. The invention avoids the problem of cracked, broken or missing pig tail clips holding conventional filters in place, thus avoiding the problem of air bypassing the filter. Also, because the holding frames 20 are permanently mounted in the mounting frames 12, there is less chance of getting misalignment, or of getting bumps in the gasket, which happens when conventional filters held by the mounting frames are repeatedly replaced.

More importantly, the present invention provides significant cost savings. Since the holding frame 20 provides structural support, the cartridge may be made with thinner gauge side walls 42 than prior art filters. Also replacement of the cartridge 40 does not result in throwing away the header section, gaskets and screen that get thrown away in the prior art filters are replaced. For these reasons, the replaceable cartridges cost less than prior art filters of comparable filtration capacity. Of course, a user may decide to purchase a cartridge that has more filtration media and hence may cost as much as prior art filters, but such a cartridge will then last longer before it needs to be changed, so that total operating costs are still reduced.

Figure 23:
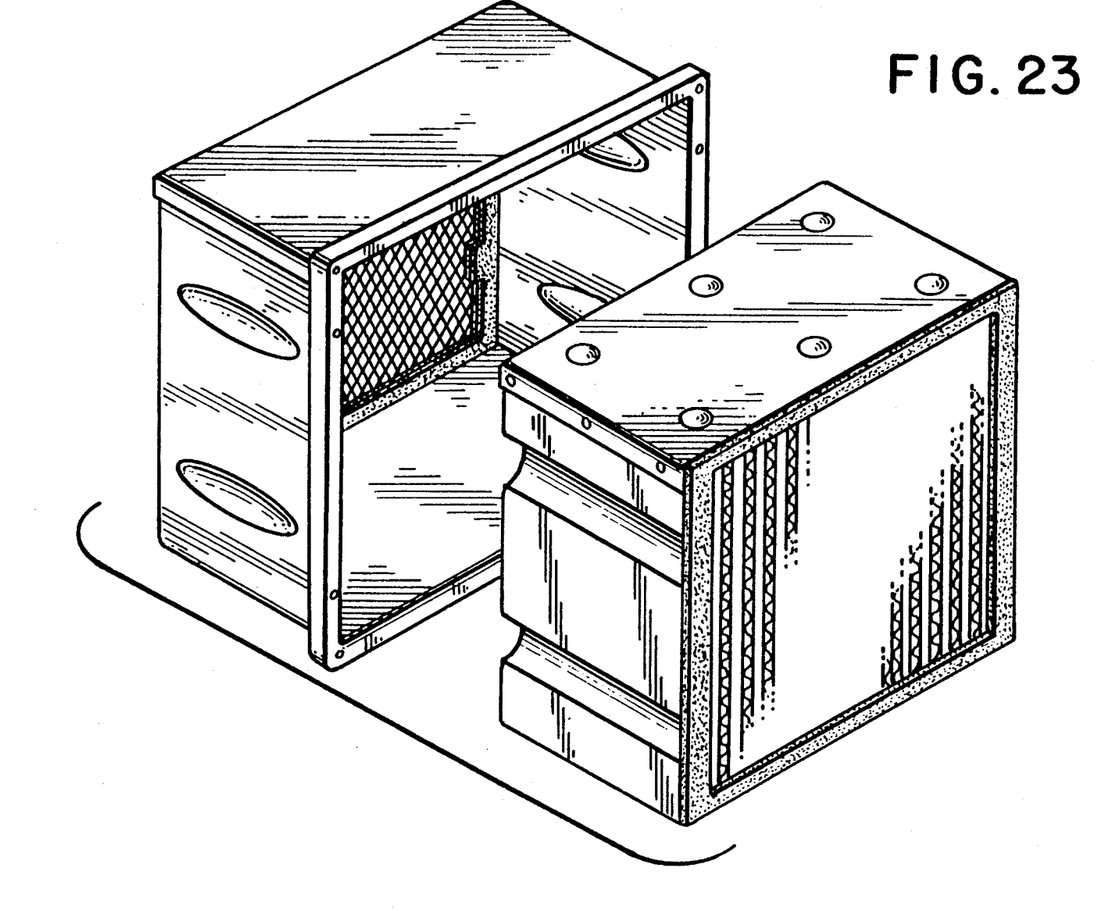
FIG. 23 is an exploded view of a third embodiment of a filter holding frame and filtration cartridge assembly used in the bank of filters of FIG. 2.

It should be appreciated that the apparatus of the present invention is capable of being incorporated in the form of a variety of embodiments, only a few of which have been illustrated and described above. For example, instead of having side spacers 123 welded to side walls 122 of the frame housing 120, the side walls of the frame housing itself could be indented to provide centering projections, as in FIG. 23. Instead of having solid side wall panels 22, the side walls of the holding frame 20 could be defined by right-angle iron pieces, one for each corner, welded together to form the holding frame. The header 24 does not need to be at the front of the holding frame 20, but could be at the back or some mid-point in between. The cover 50 and welded screen 29 on the back of holding frame 20 could be transposed, to provide a rear-loading holding frame. The projections 141 could be provided on the bottom side wall 122 of the holding frame 120 instead of on the bottom side wall 142 of cartridge 140. Projections could be included on all four sides of the cartridge, and the side spacers 123 could then be deleted.

The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

I claim:

1. A system for filtering air comprising:
  a) a plurality of mounting frames arranged to support a bank of filtration units;
  b) a holding frame in the form of a rectangular box with four side walls in each mounting frame, the holding frame having a header for engaging the mounting frame, the holding frames each being sealed with respect to the mounting frames to prevent air from passing between the mounting frames and the holding frames;
  c) a replaceable filtration cartridge within each holding frame and containing filtration media, the media being sealed within the filtration cartridge so as to assure that air passing through the cartridge is filtered by said media, the cartridge having four side walls;
  d) a seal between each cartridge and its respective holding frame to prevent air from passing between the holding frames and the cartridges; and
  e) spacers between at least two of the side walls of the holding frame and the respective side walls of the cartridge.

2. The system of claim 1 wherein the cartridge is insertable into the front face of said box in the same direction as air flows through the cartridge when the system is in operation.

3. The system of claim 1 wherein the holding frame further comprises an inwardly projecting flange at the rear of the box for supporting said cartridge and carries a gasket on said flange to seal between said cartridge and the holding frame.

4. The system of claim 1 further comprising a cover member releasably fastened to the header for holding the cartridge into the holding frame.

5. The system of claim 4 wherein a gasket is provided on the rear side of the cover member and seals between the cartridge and the holding frame.

6. The system of claim 1 wherein each of the components of the system is constructed of a material such that the system can effectively filter air at temperatures up to at least 900° F.

7. The system of claim 1 wherein the filtration media is effective for filtering out particles 10 microns or larger in size.

8. The system of claim 1 wherein the mounting frames each comprise a flange in contact with said header, and said header is constructed with a solid face that contacts said mounting frame flange.

9. The system of claim 1 wherein the cartridge is made entirely of incineratable material.

10. The system of claim 1 wherein the holding frames are secured to the mounting frames by bolts.

11. The system of claim 1 wherein the seal between the cartridge and the mounting frame comprises either a fiberglass, neoprene rubber or foam gasket.

12. A holding frame and removable filter cartridge combination for use in filtering air, the combination comprising:
a) a box-shaped holding frame having four side walls, a header attached to the side walls at the front of the box, spacers on the inside of at least two opposite sidewalls and an inwardly projecting flange on the rear of the box;
b) a filter cartridge slidably fit within the holding frame, the cartridge comprising four side walls slightly smaller in outside dimension than the inside dimension of the side walls, including said spacers, of the holding frame, and filtration media sealed within the side walls of the cartridge so as to assure that air passing through the cartridge is filtered by said media, a back side of the cartridge bearing against the inwardly projecting flange of the holding frame;
c) a cover plate releasably secured to the header for holding the cartridge inside said holding frame; and
d) a seal to prevent air from passing between the cartridge and the holding frame.

13. The combination of claim 12 wherein the inwardly projecting flange of the holding frame is completely around the inside periphery of the rear of the holding frame and the seal comprises a gasket on the inwardly projecting flange.

14. The combination of claim 12 wherein the cover plate covers the space between the walls of the cartridge and the walls of the holding frame and the seal comprises a gasket on the rear side of the cover plate.

15. The combination of claim 12 wherein the seal comprises two gaskets, one on the inwardly projecting flange of the holding frame and one on the rear side of the cover plate.

16. The combination of claim 12 further comprising a screen material on the rear of the holding frame to help support the filtration media.

17. The combination of claim 12 wherein the cartridge comprises outward facing projections on at least one of its side walls other than the side walls adjacent the at least two holding frame side walls having the spacers thereon.

18. A filter holding frame for use with a replaceable filter cartridge comprising:
a four side walls forming a rectangular box with an open front face for receiving a filter cartridge with spacers on at least two of the side walls of the holding frame for use in centering a filter cartridge placed in the holding frame;
b) a header attached to the side walls for securing the holding frame to a support structure; and
c) an inwardly projecting flange at the rear of the box for abutting the filter cartridge when placed therein.

19. The filter holding frame of claim 18 wherein the spacers run in the direction of air flow through the holding frame and the flange includes extensions protruding inwardly in line with the spacers.

20. A filtration cartridge for use in a filter holding frame designed for easy replacement of the filter cartridge, the cartridge comprising:
a) four side walls forming a rectangular box with an open front face and open rear face;
b) filtration media disposed within said box, the filter media being sealed with respect to the side walls to assure that air passing through the cartridge is filtered by said filter media; and
c) flanges connected to the rear face of the box and extending outwardly of the side walls to provide a surface to seal against the filter holding frame, the flanges including cut-outs to cooperate with side spacers on the inside wall of the holding frame to allow the cartridge to slide into the holding frame.

21. The filtration cartridge of claim 20 further comprising a strap between two opposite side walls and across the front of the cartridge to provide a handle for removing the cartridge from the filter holding frame.

22. A filtration cartridge for use in a filter holding frame designed for easy replacement of the filter cartridge, the cartridge comprising:
a) four side walls forming a rectangular box with an open front face and open rear face wherein the outside of at least one side wall includes outwardly extending projections to space the cartridge from the frame;
b) filtration media disposed within said box, the filter media being sealed with respect to the side walls to assure that air passing through the cartridge is filtered by said filter media; and
c) flanges connected to the rear face of the box and extending outwardly of the side walls to provide a surface to seal against the filter holding frame.

23. The system of claim 1 wherein the spacers comprise channel members attached to the inside of the side walls of the holding frame.

24. The system of claim 1 wherein the spacers comprise inwardly projecting indentations in the side walls of the holding frame.

25. The system of claim 1 wherein the spacers comprise outwardly extending projections on at least one of the cartridge side walls.

26. The system of claim 1 wherein the spacers are between at least three of the side walls of the holding frame and the respective side walls of the cartridge, one of said three side walls constituting a horizontal bottom side wall and the other two said side walls being vertical when the system is in operation, the spacers cooperating to center the cartridge in the holding frame.

27. The system of claim 1 wherein the spacers are between at least three of the side walls of the holding frame and the respective side walls of the cartridge, one of said three side walls constituting a horizontal bottom side wall and the other two said side walls being vertical when the system is in operation, the spacers cooperating to make it easy to slide the cartridge out of the holding frame.

28. The system of claim 1 wherein the filtration media comprises pleats and the spacers and the configuration of the cartridge assures that the pleats are vertical when the cartridge is placed in the holding frame.

* * * * *